United States Patent
Welch et al.

(10) Patent No.: US 7,444,139 B1
(45) Date of Patent: Oct. 28, 2008

(54) METHOD AND SYSTEM FOR USE OF INTELLIGENT NETWORK PROCESSING TO PREMATURELY WAKE UP A TERMINATING MOBILE STATION

(75) Inventors: David Welch, Shawnee, KS (US); Thomas M. Sladek, Overland Park, KS (US); Baoquan Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1166 days.

(21) Appl. No.: 10/622,395

(22) Filed: Jul. 18, 2003

Related U.S. Application Data

(63) Continuation-in-part of application No. 10/356,310, filed on Jan. 30, 2003.

(51) Int. Cl.
H04M 3/42 (2006.01)
H04B 7/00 (2006.01)
H04L 12/16 (2006.01)
H04Q 11/00 (2006.01)

(52) U.S. Cl. .............. 455/416; 455/518; 455/519; 455/520; 455/521; 370/260; 370/261; 370/262

(58) Field of Classification Search .............. 455/416, 455/518–521; 370/260–262
See application file for complete search history.

(56) References Cited

U.S. PATENT DOCUMENTS

| | | |
|---|---|---|
| 4,870,408 A | 9/1989 | Zdunek et al. |
| 5,442,809 A | 8/1995 | Diaz et al. |
| 5,568,511 A | 10/1996 | Lampe |
| 5,710,591 A | 1/1998 | Bruno et al. |
| 5,818,836 A | 10/1998 | DuVal |
| 5,850,611 A | 12/1998 | Krebs |
| 5,884,196 A | 3/1999 | Lekven et al. |
| 5,936,964 A | 8/1999 | Valko et al. |

(Continued)

FOREIGN PATENT DOCUMENTS

EP 0 817 457 1/1998

(Continued)

OTHER PUBLICATIONS

International Search Report from International Application No. PCT/US2003/02950, dated Jan. 30, 2003.

(Continued)

Primary Examiner—Vincent P. Harper
Assistant Examiner—Marisol Figueroa

(57) ABSTRACT

A method and system for reducing latency in initiation of a real-time data session between wireless communication stations. In order to initiate a session with one or more target parties, an originating station will send a voice call origination message to a network switch, providing in the origination message (i) a session-initiation feature code and (ii) a target code indicative of the one or more target parties. The switch will then detect the session-initiation feature code as an intelligent-network trigger and responsively signal to a service controller, which will in turn signal to a communication server. The communication server will then invite the originating station and each of the one or more target parties to participate in the session, setting up a conference leg with each and bridging the legs together to allow the session to proceed.

14 Claims, 6 Drawing Sheets

U.S. PATENT DOCUMENTS

| | | | |
|---|---|---|---|
| 5,983,099 | A | 11/1999 | Yao et al. |
| 6,014,556 | A | 1/2000 | Bhatia et al. |
| 6,032,051 | A | 2/2000 | Hall et al. |
| 6,041,241 | A | 3/2000 | Willey |
| 6,119,017 | A | 9/2000 | Cassidy et al. |
| 6,178,323 | B1 | 1/2001 | Nagata |
| 6,292,671 | B1* | 9/2001 | Mansour ..................... 455/518 |
| 6,317,595 | B1* | 11/2001 | St. John et al. .............. 455/417 |
| 6,381,467 | B1 | 4/2002 | Hill et al. |
| 6,490,452 | B1 | 12/2002 | Boscovic et al. |
| 6,526,377 | B1 | 2/2003 | Bubb |
| 7,151,753 | B2* | 12/2006 | Chaney et al. .............. 370/261 |
| 7,154,864 | B2* | 12/2006 | Costa-Requena et al. ... 370/261 |
| 2002/0034166 | A1* | 3/2002 | Barany et al. ............... 370/329 |
| 2002/0055364 | A1 | 5/2002 | Wang et al. |
| 2002/0071445 | A1 | 6/2002 | Wu et al. |
| 2002/0114322 | A1* | 8/2002 | Xu et al. ..................... 370/352 |
| 2002/0145990 | A1 | 10/2002 | Sayeedi |
| 2002/0147818 | A1 | 10/2002 | Wengrovitz |
| 2002/0172165 | A1 | 11/2002 | Rosen et al. |
| 2002/0172169 | A1 | 11/2002 | Rosen et al. |
| 2002/0173325 | A1 | 11/2002 | Rosen et al. |
| 2002/0173326 | A1 | 11/2002 | Rosen et al. |
| 2002/0173327 | A1 | 11/2002 | Rosen et al. |
| 2002/0177461 | A1 | 11/2002 | Rosen et al. |
| 2002/0191583 | A1 | 12/2002 | Harris et al. |
| 2003/0008657 | A1 | 1/2003 | Rosen et al. |
| 2003/0021264 | A1 | 1/2003 | Zhakov et al. |
| 2003/0114156 | A1 | 6/2003 | Kinnavy |
| 2003/0186702 | A1* | 10/2003 | McConnell et al. ......... 455/450 |
| 2004/0006623 | A1* | 1/2004 | Gourraud et al. ............ 709/227 |
| 2004/0009761 | A1* | 1/2004 | Money et al. ............... 455/406 |
| 2004/0082352 | A1* | 4/2004 | Keating et al. .............. 455/519 |
| 2004/0192363 | A1* | 9/2004 | Rosetti et al. ............... 455/509 |
| 2005/0239485 | A1* | 10/2005 | Kundu et al. ................ 455/519 |
| 2007/0275697 | A1* | 11/2007 | Aminzadeh .............. 455/414.1 |

FOREIGN PATENT DOCUMENTS

| | | |
|---|---|---|
| EP | 0 984 608 | 3/2000 |

OTHER PUBLICATIONS

Office Action from U.S. Appl. No. 10/067,080, dated May 21, 2003.
Office Action from U.S. Appl. No. 10/067,080, dated Apr. 27, 2004.
International Search Report from International Application No. PCT/US02/31411, dated Mar. 4, 2003.
International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002 entitled "Method for Call Setup Using Short Data Bursts".
3rd Generation Partnership Project 2 "3GPP2", Fast Call Set-Up, Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Talk'," http://siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URI," Network Working Group, Apr. 2001.
Ericsson, www.telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Local Coordination," Network Working Group, Internet-Draft, May 30, 2001.
TR45, Medium Access Control (MAC) Standard for cdma2000 Spread Spectrum System, IS-2000-3, Jul. 12, 1999.
3rd Generation Partnership Project 2 '3GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
Oma, Discussion and definitions on PoC Floor Control, Input Contribution, Doc #OMA-REQ-2003-0375-PoC_Floor_Control, Jun. 2, 2003.
Oma, "PoC Use case: Mobile—PC Example," Input Contribution, Doc #OMA-REQ-2003-0323 PoC Mobile-PC use case, May 5, 2003.
Oma, "PoC Use case: Multimedia Group Call Example," Input Contribution, Doc #OMA-REQ-2003-0306-PoC UseCase-group-multimedia-scenario, May 6, 2003.
Oma, "PoC Use case: Examples of User Requirements," Input Contribution, Doc #OMA-REQ-2003-0305-PoC Use Case, May 6, 2003.
Oma, "Inputs for PoC Requirements Document," Input Contribution, Doc #OMA-REQ-2003-0367-PoC_Input_Motorola, May 29, 2003.
Oma, "Push to Talk over Cellular (PoC)", Version: 0.1.6, May 12, 2003.

\* cited by examiner

METHOD AND SYSTEM FOR USE OF INTELLIGENT NETWORK PROCESSING TO PREMATURELY WAKE UP A TERMINATING MOBILE STATION

REFERENCE TO RELATED APPLICATIONS

This is a continuation-in-part of U.S. patent application Ser. No. 10/356,310, filed Jan. 30, 2003, the entirety of which is hereby incorporated by reference.

BACKGROUND

1. Field of the Invention

The present invention relates to communications and, more particularly, to initiation of real-time media sessions. The invention is particularly useful for reducing latency in the initiation of "instant connect" or "push to talk" (PTT) sessions between data-capable mobile stations, such as 3G mobile stations for instance. But the invention can be advantageously applied in other scenarios as well.

2. Description of Related Art

In an exemplary wireless communication system, each mobile station may communicate via an air interface with a base transceiver station (BTS) and in turn with a base station controller (BSC). The BSC may then be coupled with a mobile switching center (MSC). Further, the BSC may be coupled with packet data serving node (PDSN) or other gateway, which may provide connectivity with an IP network, such as the public Internet or a private intranet (e.g., a wireless carrier's core IP network). The mobile station may thus communicate with entities on the IP network via a communication path comprising the air interface, the BTS, the BSC and the PDSN.

A mobile station can initiate packet-data communication by sending a packet-data origination request message over an air interface access channel, and via the BSC, to the MSC. Applying industry standards, the origination request message may include a "packet data" service option code that characterizes the requested communication as packet-data communication, as compared with traditional voice communication. When the MSC receives the origination request, it may then detect the "data" service option code and responsively send the message back to the BSC for handling. (Note that, commonly, the MSC and BSC may be physically co-located and perhaps integrated in a common entity, sometimes referred to as an MSC/BSC or simply "switch.")

In turn, when the BSC receives the origination request from the MSC, the BSC may establish a radio link layer connection with the mobile station, by assigning the mobile station to operate on a particular traffic channel over the air interface (e.g., a fundamental traffic channel, and perhaps one or more supplemental channels). In addition, the BSC may pass the origination request to the PDSN. And the PDSN and mobile station may then negotiate with each other to establish a data-link layer connection, typically a point-to-point protocol (PPP) session over which packet data can be communicated between the mobile station and the PDSN.

As part of this process, the mobile station may obtain an IP address, to facilitate packet communications. For instance, the PDSN may assign an IP address to the mobile station, or the PDSN may communicate with a mobile-IP "home agent" to obtain an IP address for mobile station.

(Note that it may also be possible for a mobile station to engage more directly in packet-switched communications, rather than communicating packet data through a PPP connection. For instance, the BTS itself might sit as a node on an IP network, and the mobile station might send and receive individual packets via the BTS.)

In most wireless communication systems like this, the radio-link layer connection with a mobile station may time-out after a predefined period of inactivity. For instance, after 10 seconds in which no data is communicated to or from the mobile station over the air interface, the BSC may release the traffic channel that had been assigned to the mobile station. At the same time, however, the data-link layer (e.g., PPP) connection with the mobile station might remain.

Once the radio-link layer connection with a mobile station has timed out, the mobile station will be considered "dormant." However, if its data-link layer connection still exists, the mobile station may still seek to send packet data to other entities, and other entities may seek to send packet data to the mobile station. When another entity seeks to send packet data to the mobile station, the BSC will page the mobile station over an air interface paging channel.

When a dormant mobile station receives a page indicative of an incoming data communication, or if the dormant mobile station seeks to send data, the radio link layer connection with the mobile station will need to be reestablished. To do so, the mobile station may send a message to the BSC over the access channel, requesting radio-link resources, and the BSC may then assign a traffic channel. The mobile station may then send or receive packet data over that traffic channel.

Some mobile stations may be equipped to automatically enter into an "always-on" data session upon power up, so as to provide IP network connectivity similar to that available through today's broadband landline modems. In particular, such a mobile station may be programmed to automatically send a "packet data" origination request upon power up and to then negotiate with the PDSN to establish a PPP session. After an initial period of inactivity, the radio-link layer connection with the mobile station may time-out. But, as indicated above, the mobile station may then acquire a radio-link connection when desired.

Note further that a mobile station that lacks both a radio-link and a data-link is considered to be in a "null" state, contrasted with a "dormant" state. In the null state, in order for the mobile station to engage in packet-data communication, it may conventionally send a packet data origination request in the manner described above.

A mobile station, like other packet-data terminals, can be further equipped to communicate real-time media, such as voice and/or video. For instance, the mobile station may include one or more media input mechanisms, such as a microphone or video camera, and may further include logic to digitize, encode and packetize media received through those mechanisms. Additionally, the mobile station may include logic to encapsulate the resulting packets with industry standard Real Time Protocol (RTP) headers and to transmit the resulting RTP packets to one or more designated addresses on the IP network.

Similarly, the mobile station may include logic to receive incoming RTP packets from the IP network, to assemble the packets in sequence, and to depacketize and decode the data carried by the packets so as to retrieve an underlying media signal. Further, the mobile station may include one or more media output mechanisms, such as a speaker or video display, through which to play out the incoming media signal to a user.

In order for a mobile station to establish RTP communication with another endpoint, the two endpoints will usually engage in setup signaling, which may take a variety of forms. For instance, according to the industry standard Session Initiation Protocol (SIP), an initiating endpoint may send to a SIP proxy server a SIP "INVITE" request message that designates a terminating SIP address. The INVITE may include a Session Description Protocol (SDP) block that characterizes the proposed session as an RTP session.

The proxy server may then query a SIP registry to determine an IP address of the terminating endpoint. And the proxy server may then forward the INVITE to that address. If the terminating endpoint agrees to establish the session, the terminating endpoint may then send a SIP "200 OK" message via the proxy server to the initiating endpoint. And the initiating endpoint may responsively send a SIP "ACK" message via the proxy server to the terminating endpoint. The endpoints may then begin to communicate RTP packets with each other.

Another way for two or more endpoints to establish and conduct a real-time media session with each other is through a communication server. The communication server may function to set up respective RTP sessions ("legs") with each participating endpoint and to bridge together the legs so that the participants can communicate with each other.

For instance, an initiating endpoint may send to a proxy server an INVITE that requests an RTP session with one or more designated terminating endpoints, and the proxy server may forward the INVITE to the communication server. The communication server may then respond with a 200 OK to the initiating endpoint, and the initiating endpoint may respond with an ACK, thus establishing an RTP leg (initiating leg) between the initiating endpoint and the communication server.

At the same time, the communication server itself may send an INVITE via the proxy server respectively to each designated terminating endpoint and establish RTP legs (terminating legs) with each of those other endpoints. In turn, the communication server may bridge together the initiating leg with each of the terminating legs, so as to allow all of the endpoints to communicate with each other.

By establishing real-time media sessions in this manner between mobile stations, a wireless carrier can conveniently provide its subscribers with PTT service. In particular, each "PTT-capable" mobile station can preferably include a button or other actuating mechanism that a user can engage in order to initiate a PTT session with a designated group of one or more other users. When the user presses the PTT button, a PTT client application on the mobile station may responsively send an INVITE request to a proxy server. And the proxy server may forward the INVITE to a PTT server.

An SDP block or a "To" field in the INVITE request may identify or list a "communication group" for the user, i.e., a group of other users with whom the initiating user would like to communicate. The PTT server may then set up RTP legs with the initiating user and with each member of the group. And the PTT server may then bridge together the communication legs in a designated manner, so as to allow the members of the group to communicate with each other and with the initiating user.

SUMMARY

Ideally, a PTT communication system should simulate instant 2-way radio communication. In particular, when a user initiates a PTT session, the user will want to be able to press the PTT button and immediately begin talking (or conveying other real-time media) to each other party "on the channel."

A problem with the existing arrangement arises, however, if the terminating mobile is dormant when the originating mobile seeks to set up an instant connect session with the terminating mobile. In particular, from the moment a user of the originating mobile invokes an instant-connect application, a period of several seconds can pass until the requested communication session is ultimately established with the terminating mobile. This several second delay typically arises as the following events occur in response to the user invoking the instant-connect application:

(1) The originating mobile sends a packet-data origination request and acquires a radio link (and a data link, if not established yet);

(2) The originating mobile then sends a session initiation request (e.g., SIP INVITE) over the radio link and data link, requesting a session with the terminating mobile;

(3) A session initiation request (e.g., the one sent by the originating mobile, or one sent by a conference server, such as a PTT server) is then sent through the radio access network for transmission to the terminating mobile;

(4) In order to be able to receive the session initiation request, the terminating mobile then acquires a radio link, thereby switching from a dormant state to an active state; and (5) The active terminating mobile then receives and responds to the session initiation request.

An exemplary embodiment of the present invention provides a new and improved mechanism for initiating a PTT session (or other packet-based real-time media session) in a way that helps reduce this latency. The exemplary embodiment recognizes that a bulk of the latency arises from the sequential occurrence of the above steps. That is, the act of waking up a terminating mobile to deliver a session-initiation request does not normally begin to occur until (1) the originating mobile acquires a radio link, (2) the originating mobile sends a session-initiation request to the PTT server, and (3) the PTT server then sends a session-initiation request to the terminating mobile.

To help fix this problem, according the exemplary embodiment, a carrier can apply intelligent-network procedures in order to detect a session initiation request from an originating station, and a communication server can then responsively invite both the originating station and one or more terminating stations to participate in the session, substantially in parallel.

More particularly, to initiate a real-time media session with at least one target party, an originating station may send a call origination message to a network switch, providing the switch with an indication of the at least one target party. In processing the call origination message, the switch may then encounter an intelligent-network trigger, which would cause the switch to signal to a service controller. And the service controller may then signal to a communication server, which would then responsively invite both the originating station and the at least one target party to participate in the session via the communication server.

By way of example, in response to a user request to initiate a PTT session, an originating mobile station may send an origination message to its local MSC, as though it were initiating a normal voice call. According to the exemplary embodiment, however, the origination message may carry as dialed digits a special PTT feature code (such as *765, for instance) as well as a target code that indicates the terminating party or parties with which the PTT session is to be established.

Upon receipt of the origination message, the local MSC may then detect the feature code as an intelligent-network trigger, and the MSC may responsively signal to a service control function (SCF) to seek call processing assistance. In particular, the MSC may send to the SCF a signaling message that provides the SCF with the dialed digits and with an identification of the originating mobile station. The SCF may then apply or invoke service logic that causes the SCF to signal to the PTT server, providing the PTT server with the target code and the identification of the originating mobile station. (The SCF could, of course, translate these values in some way before providing them to the PTT server, if desired.)

According to the exemplary embodiment, the PTT server may then invite the originating mobile station and each terminating mobile station, substantially in parallel (i.e., at about the same time), to participate in the session. For instance, the PTT server may send a SIP INVITE to the originating mobile and a SIP INVITE to each terminating mobile. Assuming that the originating and terminating mobile stations are dormant at the time, each station would then be paged and would transition to an active state in order to receive the INVITE message from the PTT server. After additional SIP signaling, a conference leg would then be established between each mobile station and the PTT server, and the PTT server may then bridge legs together to allow the session to proceed.

Advantageously, by inviting an originating mobile station and each terminating mobile station to participate in the session substantially in parallel, the process of waking up the mobile stations at both ends (originating and terminating) would likely occur in parallel. This thereby reduces or eliminates the sequential nature of the setup process described above and can therefore make initiation of a PTT session (or the like) more "instant."

These and other aspects and advantages of the exemplary embodiment will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Basic Operation

Figure 1:
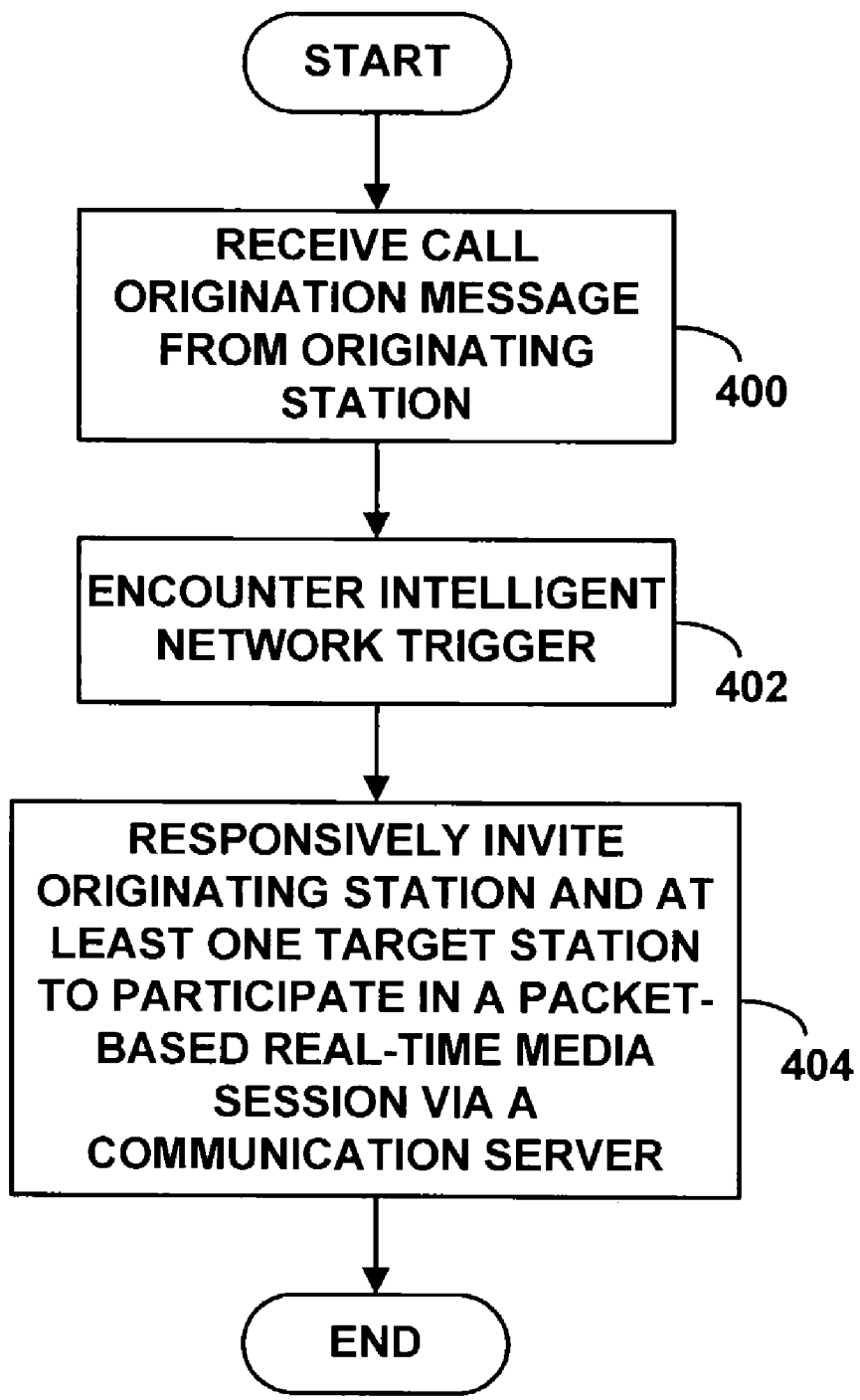
FIG. 1 is a flow chart depicting functions that can be carried out in accordance with the exemplary embodiment.

Referring to the drawings, FIG. 1 is a flow chart generally depicting how an exemplary embodiment of the invention can operate in practice. As shown in FIG. 1, at block 400, a carrier receives a call origination message from an originating station. At block 410, while processing the origination message, the carrier encounters an intelligent-network trigger. In response, at block 420, the carrier invites the originating station at least one target station to participate in a packet-based real-time media session via a communication server.

Figure 2:
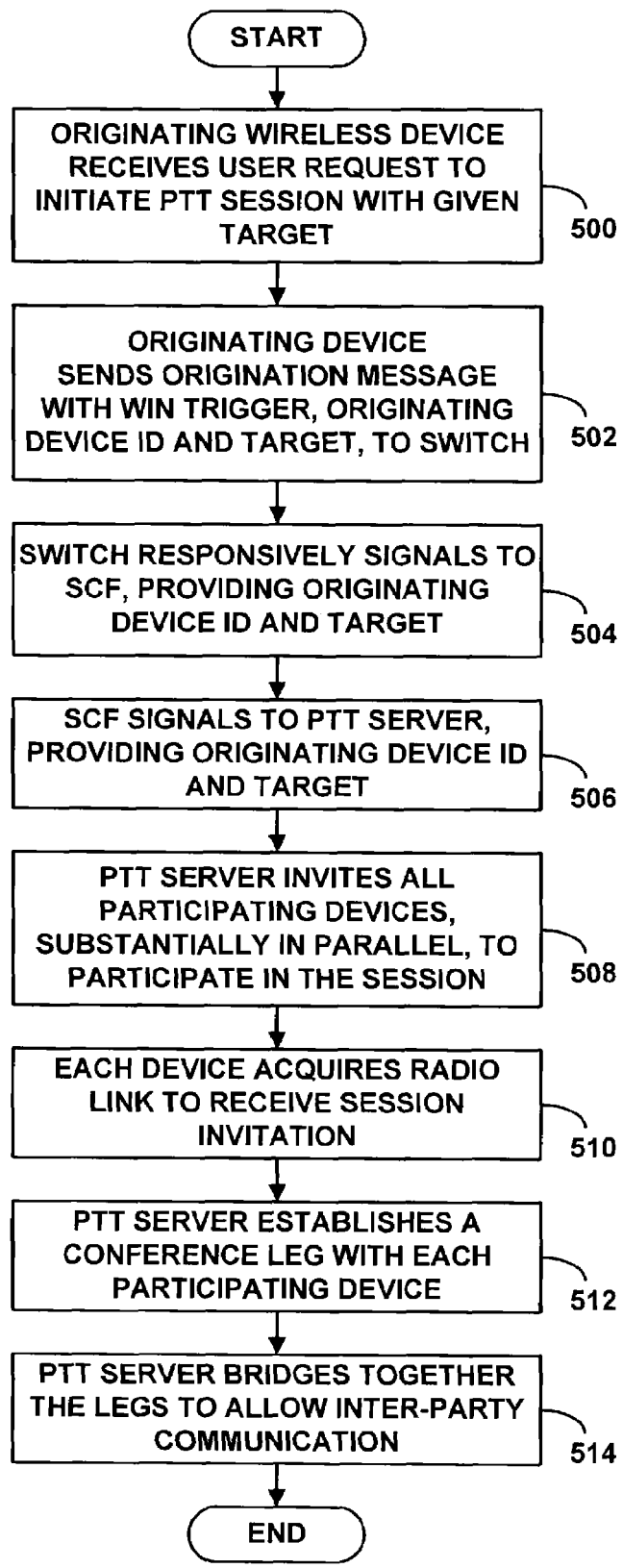
FIG. 2 is a flow chart depicting functions that can be carried out in accordance with the exemplary embodiment.

Referring next to FIG. 2, a flow chart is provided to illustrate in more detail how the exemplary embodiment can operate to initiate a PTT session. Note that the same process could be used to initiate another sort of packet-based real-time media session as well, but PTT will be used throughout the remainder of this description for purposes of example.

As shown in FIG. 2, at block 500, an originating wireless device receives a user request to initiate a PTT session with a given target user or group. In response, at block 502, the originating device sends a call origination message to a local switch, providing in the origination message a wireless-intelligent-network (WIN) trigger, a originating device ID, and an indication of the designated target.

In response to the WIN trigger, at block 504, the switch signals to an SCF, similarly providing the SCF with the originating device ID an the indication of the designated target. And at block 506, the SCF then signals to a PTT application server, similarly providing the PTT server with the originating device ID and the indication of the designated target.

At block 508, the PTT server then invites the originating device and each device of the target (e.g., one or more terminating mobile stations), substantially in parallel, to participate in the session. In the exemplary embodiment, this session invitation will cause each device to acquire a radio link over which to receive the session invitation if the device does not currently have a radio link (e.g., if the device is dormant) as indicated, at step 510. In this regard, the invitation can take various forms and could vary from device to device.

For example, the invitation to each device (originating and terminating) can be a packet-based invitation message, such as a SIP INVITE. As noted above, if a given device is dormant, the device will then need to acquire a radio link over which to receive the SIP INVITE. That is, a BSC serving the device may page the device and the device may responsively send a packet-data origination message requesting a radio link for packet-data communications.

At block 512, after further session setup signaling with each device, the PTT server would thereby establish a conference leg (e.g., an RTP session) respectively with each device. For instance, if the invitation to a given device was a SIP INVITE, the device may respond with a SIP 200 OK, and the PTT server may then reply with a SIP ACK to complete setup of a conference leg with the device. In turn, at block 514, the PTT server would bridge the legs together so as to allow the devices (and users of the devices) to communicate with each other.

2. Example Network Arrangement

Figure 3:
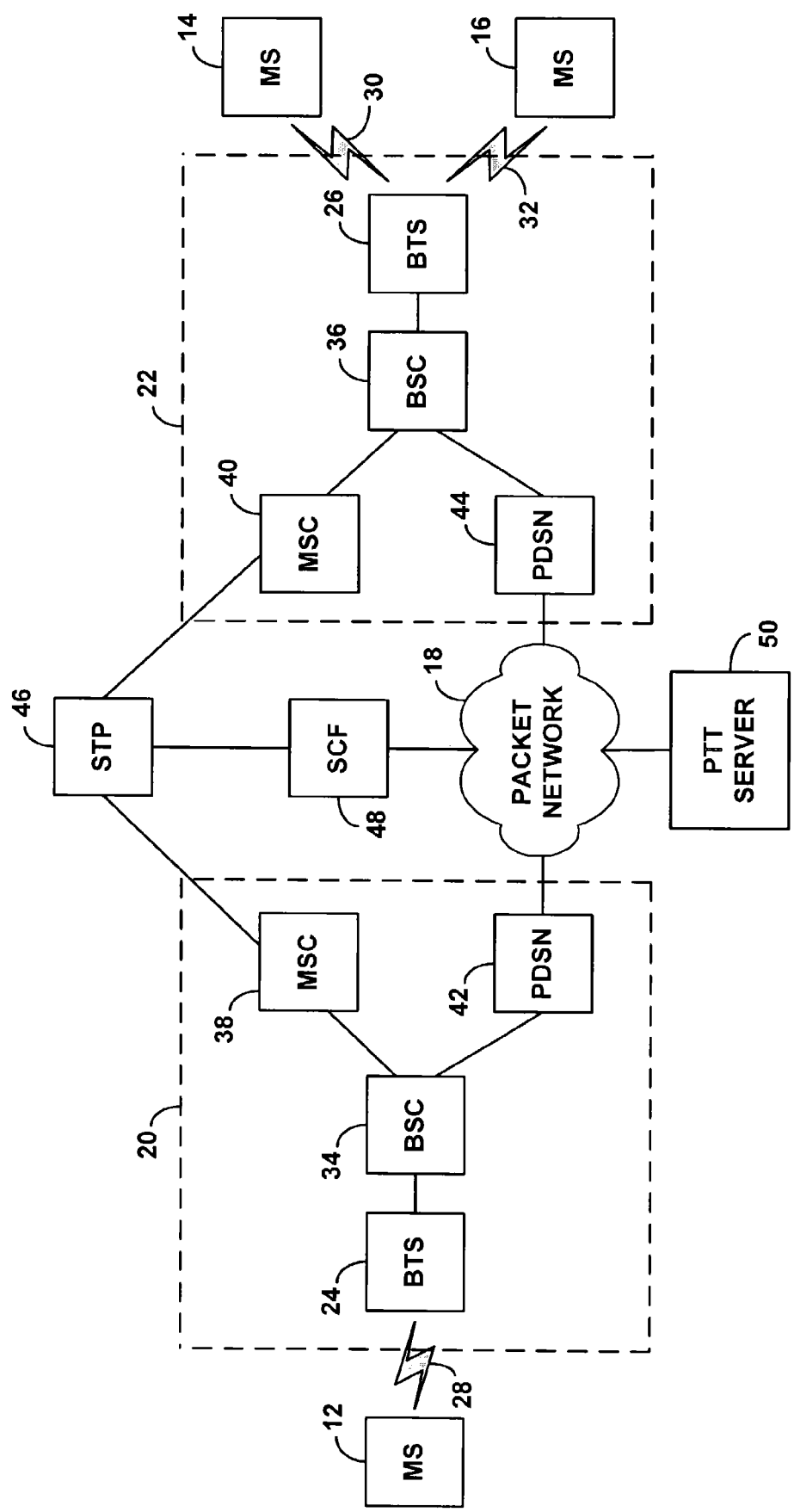
FIG. 3 is a block diagram of system in which the exemplary embodiment can be implemented.

FIG. 3 provides an overview of a system in which an exemplary embodiment of the invention can be implemented. FIG. 3 depicts an arrangement involving three mobile stations 12, 14, 16, in which a user of mobile station 12 may seek to initiate a PTT session (or other packet-based real-time media session) with users at mobile stations 14 and 16. Thus, in this example arrangement, mobile station 12 is the originating mobile station, and mobile stations 14 and 16 are the terminating mobile stations.

It should be understood, however, that there could be more or fewer terminating mobile stations and that the arrangement shown in FIG. 3 is merely an example and is not intended to be limiting. Further, note that the term "mobile station" is used here by convention to refer to a wireless communication device. In practice, the wireless communication device could actually be mobile, such as a traditional cellular phone for instance, or it could be a fixed wireless device, such as a wirelessly connected pay phone.

Each mobile station shown in FIG. 3 is served by a radio access network that provides connectivity with a packet-switched network 18. As illustrated, for instance, mobile station 12 is served by a first radio access network 20, and mobile stations 14 and 16 are served by a second radio access network 22. Alternatively, each mobile station could be served by a separate radio access network, or all of the mobile stations could be served by a common radio access network.

For sake of example, the radio access networks 20, 22 are both shown with the same arrangement of components. In particular, each radio access network includes a BTS 24, 26 that communicates over an air interface 28, 30, 32 with one or more mobile stations. Further, each BTS is then coupled with a BSC 34, 36 that is then coupled with an MSC 38, 40 and also with a PDSN 42, 44.

Conventionally, each MSC 38, 40 would provide connectivity with the public switched telephone network (PSTN, not shown) and could function to set up voice calls over the PSTN on behalf of mobile stations that they serve. For this purpose, each MSC 38, 40 is normally coupled with a signaling network, which is represented in FIG. 3 by a signal transfer point (STP) 46. The signaling network, which may be a common channel interoffice signaling system (CCISS) employing Signaling System #7 (SS7), preferably allows the MSCs to exchange call setup signaling messages with each other so as to set up calls.

Further, to facilitate call processing, an SCF 48 may also be coupled with the signaling network 46 as shown in FIG. 3. The SCF 48 could comprise one or more service control points (SCP), integrated service control points (ISCPs), home location registers or other entities. In the arrangement of FIG. 3, SCF 48 is also shown coupled with packet network 18 (e.g., as a node on the network), so as to be able to communicate with other entities on the network.

In normal intelligent-network call processing, when an MSC such as MSC 38 receives an origination message from a mobile station that it serves such as mobile station 12, the MSC may encounter a logical call processing trigger that causes the MSC to send an origination request (ORREQ) message via the signaling network 46 to the SCF 48. The ORREQ would normally carry an identifier of the calling party (such as a mobile identification number (MIN)), and the digits dialed by the calling party (such as a telephone number of a called party). The SCF 48 may then apply or invoke service logic to process the ORREQ and may then respond to the querying MSC with call handling instructions, such as an indication of whether and where to route the call.

Also conventionally, each PDSN 42, 44 in FIG. 3 provides connectivity with packet network 18. As noted in the background section above, in some systems, a mobile station can acquire a packet-data connection by sending a packet-data origination message over an air interface access channel to its serving MSC, which the MSC would detect as a packet-data origination message and responsively send back to the serving BSC. The BSC would then assign a radio link (traffic channel) over which the mobile station can communicate with a BTS, and a packet control function (PCF) in the BSC would signal to the serving PDSN, which would enter into a PPP session with the mobile station and assign a mobile-IP address to the mobile station. The mobile station can then engage in packet-data communication with other entities via the PDSN and packet network. For instance, the mobile station can engage in SIP signaling and in RTP communications with other entities on the packet network.

As also shown in FIG. 3, a PTT server 50 or other sort of communication server then also sits on packet network 18. The PTT server 50 functions to bridge communications between mobile stations or other entities so as to facilitate packet-based real-time media communications between the stations. For instance, the PTT server 50 may enter into a first RTP session (conference leg) with mobile station 12, a second RTP session (conference leg) with mobile station 14, and a third RTP session (conference leg) with mobile station 16, and the PTT server can then receive and forward media in real-time between the stations, so as to allow users of the stations to communicate with each other. To facilitate set up of such sessions, each mobile station and the PTT server may be equipped to engage in SIP signaling.

3. Example Operation

Figure 4:
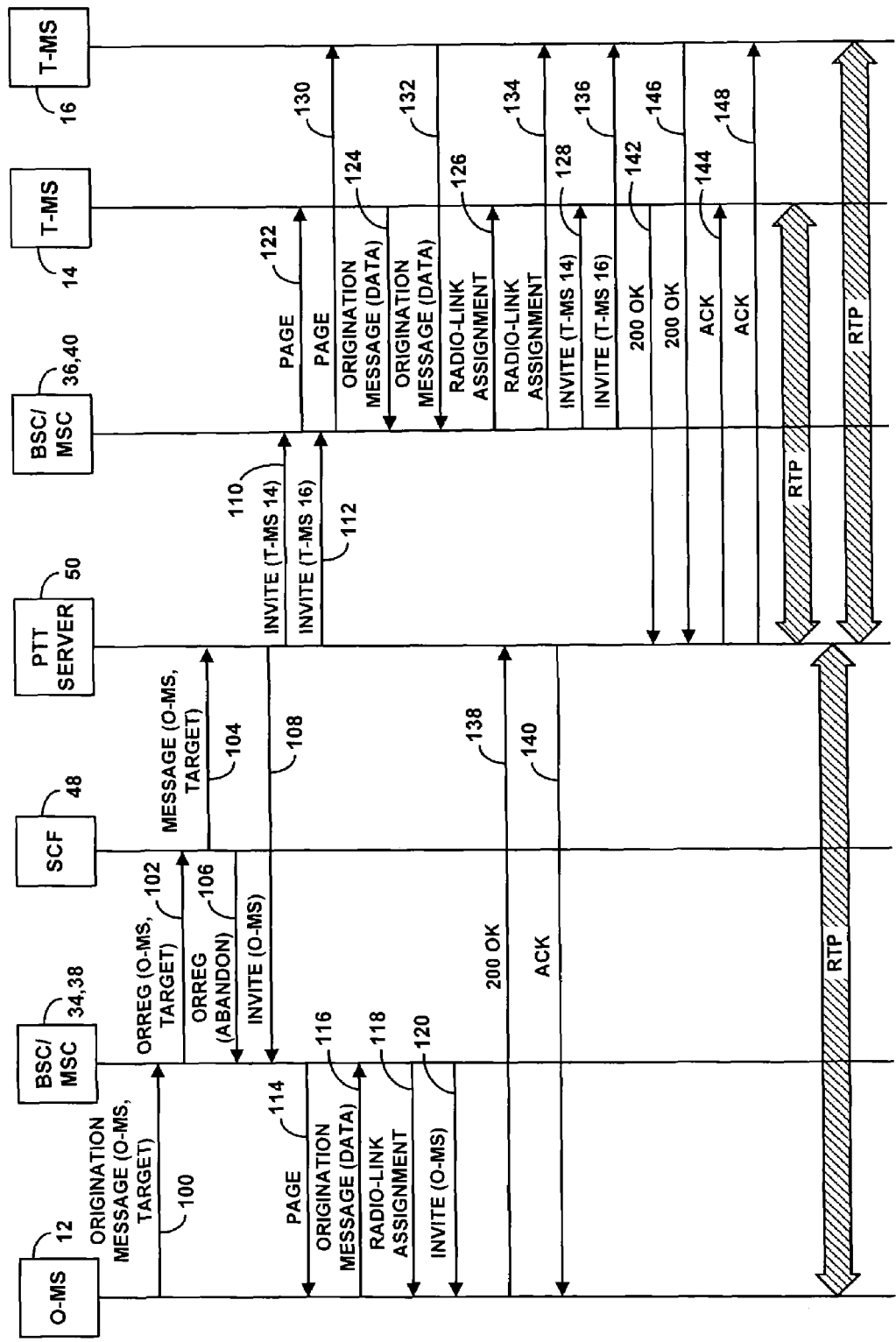
FIG. 4 is a message flow diagram depicting message flow during setup of a PTT session in accordance with the exemplary embodiment.

Referring next to FIG. 4, a message flow diagram is provided to illustrate how the exemplary embodiment could be carried out in the arrangement shown in FIG. 3. In FIG. 4, the originating mobile station 14 is designated as "O-MS" and the two terminating mobile stations are each designated as "T-MS". Further, the BSC and MSC in each radio access network are combined into a single entity for simplicity.

As shown in FIG. 4, at step 100, mobile station 12 sends an origination message to MSC 38, in response to a user request to initiate a PTT session with users operating mobile stations 14 and 16. This origination message can comply with any sort of air interface protocol that is in use. For instance, the origination message could comply with the well known industry standard IS-95 or IS-2000 (cdma2000), or it could comply with other protocols such as TDMA or GSM for instance.

The origination message may be an ordinary voice call origination message of the type that a mobile station would send to place a voice call. However, where the origination message would normally carry digits indicating a telephone number of a called party, the exemplary origination message will preferably include special digits that will trigger initiation of a packet-based real-time media session with one or more target parties.

In particular, in accordance with the exemplary embodiment, the origination message will preferably include as dialed digits (i) a PTT dial code (or more generally a "session-initiation feature code") that reflects a desire to initiate a PTT session and (ii) a target code that indicates at least one target with which the PTT session should be established.

For consistency with normal voice call origination procedures, the target code can take the form of a MIN that represents the at least one target. In particular, if only one target mobile station is to be invited to the session, then the target code can conveniently be the MIN of that one mobile station. On the other hand, if a group of mobile stations (such as mobile stations 14 and 16) is to be invited, the target code can be the digit 0 followed by a special MIN that has been reserved to represent the group of mobile stations.

Further, for consistency with normal intelligent-network procedures, the PTT dial code can take the form of a feature code of the type that can be commonly dialed to trigger an intelligent-network service. Usually, such a feature code comprises an asterisk followed by a predefined digit sequence (e.g., *123, *67, etc.) However, the PTT dial code could take any form, provided that the switch is arranged to detect it. Further, the PTT dial code and target code could be combined into one digit sequence that can be detected by the switch. For example, a specially coded telephone number (MIN) could represent both a PTT dial code and a target code.

In the example of FIG. 4, assume the origination message includes the following parameters:

PTT dial code: *765
Target code: 0-1110101013
Originating MIN: 3122288000

That is, the origination message may specify that the message originates from a mobile station with MIN 3122288000, and the origination message may carry dialed digits *76501110101013 as a PTT dial code and target code.

Upon receipt of the origination message, MSC 38 begins to process the origination message and encounters an intelligent-network trigger that causes MSC 38 to signal to SCF 48 for assistance. For instance, the MSC may detect the PTT dial code as an intelligent-network trigger that points to SCF 48. Thus, at step 102, MSC 38 then sends an ORREQ message to SCF 48, indicating in the ORREQ message (i) the PTT dial code, (ii) the target code, and (iii) the originating MIN, or simply the target code and originating MIN. Alternatively, the ORREQ can carry other parameters that convey sufficient information to the SCF.

Upon receipt of the ORREQ, the SCF applies service logic to interpret the parameters in the ORREQ. For instance, in response to the PTT dial code, the SCF may apply designated service logic to interpret the target code or to simply send the target code and originating MIN to PTT server 50. Thus, at step 104, the SCF may send to PTT server 50, via packet network 18 for instance, a message that carries the target code and the originating MIN. The message to PTT server 50 could take any form, such as a SIP message or a specially coded UDP packet for instance.

Further, at step 106, the SCF 48 may send an "orreq" response message to the querying MSC instructing the MSC to drop the call origination. MSC 36 may then respond similarly to mobile station 12, and mobile station 12 may accordingly abandon the call origination. This frees the mobile station 12 to be able to receive and respond to a page message when a SIP INVITE arrives at BSC 34 for transmission to the mobile station.

When the PTT server 50 receives the message from the SCF 48, the PTT server then interprets the target code to determine which terminating mobile station(s) to invite to the session. This interpretation can take various forms. Using the exemplary process described above, for instance, if the target code does not begin with a zero, then the PTT server 50 may conclude that the target code is a MIN of a terminating mobile. On the other hand, if the target code begins with a zero, then the PTT server may conclude that the target code is a group ID. In that case, the PTT server may refer to stored group data to determine the mobile stations that are members of the group, such as the MIN of each group member.

The PTT server 50 then invites each terminating mobile station and the originating mobile station to participate in the session by sending a session-initiation message to each mobile station. For instance, the server may generate for each mobile a SIP INVITE inviting the mobile station to participate in an RTP session with the server (i.e., to set up an RTP conference leg between the server and the mobile station). Each INVITE could be directed to a SIP address of the mobile station, which could be keyed to the MIN of the mobile. For instance, the INVITE to the originating mobile station 12 could designate the SIP address "sip: 3122288000@ptt.sprintpcs.com" as a destination. The PTT server may then send each INVITE to a proxy server (not shown) for transmission to the mobile-IP address of the destination mobile station, as shown at steps 108, 110, 112.

Assuming that mobile stations 12, 14, 16 are all dormant at this time, when the INVITE messages reach BSCs 34, 36, the BSCs will then page the mobiles, and each mobile will request and receive a traffic channel over which to receive its INVITE.

For instance, when BSC 34 receives the INVITE destined to the IP address of mobile station 12, BSC 34 pages mobile station 12 as shown at step 114. At step 116, mobile station 12 then responsively sends a packet-data origination request message to BSC 34, asking for a radio link over which to engage in packet-data communications. And at step 118, BSC 34 assigns a radio link for mobile station 12 to use. At step 120, BSC 34 then sends the INVITE via that radio link to mobile station 12.

Similarly, when BSC 36 receives the INVITE destined to the IP address of mobile station 14, BSC 36 pages mobile station 14 as shown at step 122. At step 124, mobile station 14 then responsively sends a packet-data origination request message to BSC 36, asking for a radio link over which to engage in packet-data communications. And at step 126, BSC 36 assigns a radio link for mobile station 14 to use. At step 128, BSC 36 then sends the INVITE via that radio link to mobile station 14.

And similarly, when BSC 36 receives the INVITE destined to the IP address of mobile station 16, BSC 36 pages mobile station 14 as shown at step 130. At step 132, mobile station 14 then responsively sends a packet-data origination request message to BSC 36, asking for a radio link over which to engage in packet-data communications. And at step 134, BSC 36 assigns a radio link for mobile station 14 to use. At step 136, BSC 36 then sends the INVITE via that radio link to mobile station 14.

As each mobile station receives its INVITE, the mobile station may then respond to the PTT server with a SIP 200 OK, and the server may then reply with a SIP ACK, to conclude set up of an RTP conference leg between the PTT server and the mobile station. Thus, as shown in FIG. 4, after mobile station 12 receives the INVITE from PTT server 50, mobile station 12 sends a 200 OK to the server at step 138, and the server replies with an ACK at step 140. Similarly, after mobile station 14 receives the INVITE from PTT server 50, mobile station 14 sends a 200 OK to the server at step 142, and the server replies with an ACK at step 144. And after mobile station 16 receives the INVITE from PTT server 50, mobile station 16 sends a 200 OK to the server at step 146, and the server replies with an ACK at step 148.

Upon completion of SIP signaling with each of the mobile stations, the PTT server 50 may then engage in RTP (or other) communication with each mobile station and bridge the communications together so as to allow users at the stations to communicate with each other. Thus, as shown in FIG. 4, mobile station 12 and PTT server 50 may engage in an RTP session 150, mobile station 14 and PTT server 50 may engage in an RTP session 152, and mobile station 16 and PTT server 50 may engage in an RTP session 154. Although theses RTP sessions are shown with bidirectional arrows, the PTT session may be half-duplex, with one station at a time sending media to the PTT server and the PTT server forwarding the media to each other station.

An advantage of the arrangement illustrated by FIG. 4 is that the originating and terminating mobile stations are awakened (to the extent necessary) and invited to participate in the session at about the same time. In particular, the exemplary arrangement avoids the need for the originating mobile station to first acquire an active data link and then send a session invitation to the communication server. By waking up and inviting the participating stations substantially in parallel, overall setup latency can be greatly reduced.

4. Example Component Functions a. Exemplary Mobile Stations

Figure 5:
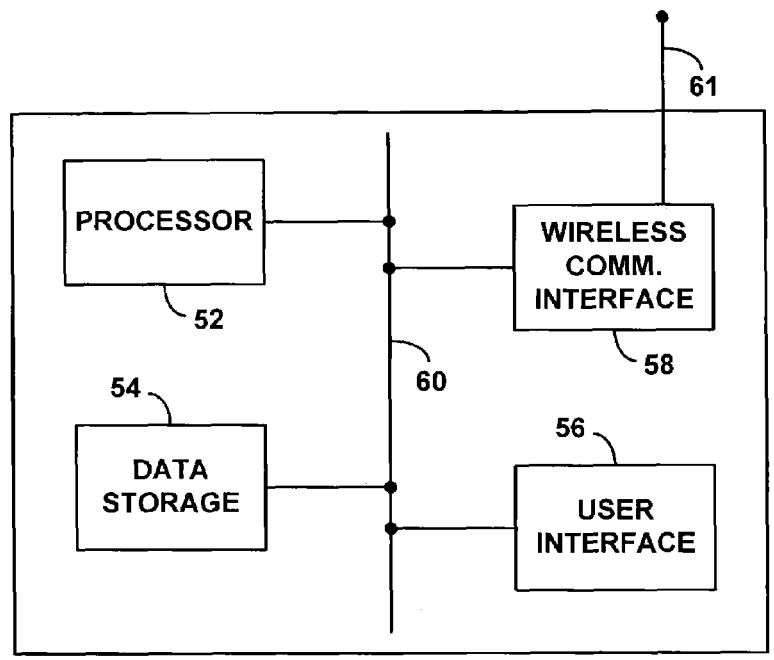
FIG. 5 is a block diagram depicting functional components of a mobile station operable in the exemplary embodiment.

Each of the mobile stations shown in FIG. 2 may be a data-capable wireless communication device of any suitable form, and they may be the same as or different than each other. To help illustrate, FIG. 5 is a simplified block diagram depicting an exemplary mobile station. As shown in FIG. 5, the exemplary mobile station includes a processor 52, data storage 54, a user interface 56, and a wireless communication interface 58, all of which may be coupled together by a system bus, network or other connection mechanism 60.

Each component of the exemplary MS can take various forms. For instance, processor 52 may one or more general purposes microprocessors and/or one or more dedicated digital signal processors (which may integrate part or all of data storage 54). And data storage 54 may be volatile and/or nonvolatile memory such as RAM, ROM or disk storage for instance.

User interface 56 may provide means for interaction with a user. As such, the user interface may include media input and output mechanisms. For the purpose of voice communications (e.g., a PTT application), these mechanisms might include a microphone (not shown) for receiving analog speech signals from a user, and a speaker (not shown) for delivering analog speech signals to a user.

The user interface may also include a display, speaker or other mechanism (not shown) for presenting information to a user, as well as an input mechanism (e.g., keyboard, keypad, microphone, mouse, and/or touch-sensitive display overlay) (not shown) for receiving input from a user. For PTT functionality, the input mechanism may also include a PTT button (not shown) or other mechanism that a user can readily engage in order to initiate PTT communication.

Wireless communication interface 58, in turn, may facilitate communication over an air interface with a respective base station. As such, the wireless communication interface may include an antenna 61 for sending and receiving radio-frequency signals over the air interface. Wireless communication interface 58 may also include a protocol-dependent chipset (not shown), which may facilitate encoding, transmission and decoding of communication signals according to a wireless protocol used by the mobile station and the radio access network serving the mobile station.

In the exemplary embodiment, data storage 52 preferably holds a set of logic executable by processor 50 to carry various functions described herein. Alternatively, various functions could be carried out by additional hardware and/or firmware not shown.

For example, the logic may be executable by the processor to support wireless packet data connectivity. In this regard, upon power on or in response to another triggering event, the logic may cause the processor send a packet-data origination message to a serving switch and to acquire a radio link and data link. Further, when the mobile station is in a dormant mode and the logic may similarly cause the processor to send a packet-data origination message so as to acquire a radio link over which to send or receive packet-data. To be able to engage in packet-data communications generally, the logic may also define a conventional IP stack.

As another example, the logic may define a PTT application with which a user can interact in order to invoke a PTT session. For instance, the PTT application may cause the processor to present the user with a menu from which the user can select a target user or group with which to engage in a PTT session. The list might be keyed to a phone book list for instance, which ties usernames together with telephone numbers. Further, when the user engages a PTT button or other mechanism, the PTT application may cause the processor to generate to a serving MSC an origination message that carries as dialed digits (i) a PTT dial code and (ii) a target code indicating the desired target user or group.

As yet another example, the logic may define a SIP user agent client (UAC) application, which enables the processor to engage in SIP signaling. In this regard, for instance, upon receipt of a SIP INVITE seeking to set up an RTP session, the logic may cause the processor to send a SIP 200 OK, and to then receive a SIP ACK.

Further, the logic preferably defines functionality to engage in voice-over-packet communications, such as RTP communications according to the well known RFC 1889. For instance, the logic may cause processor to receive voice from user interface 56, to digitize and encode the speech and to send an outgoing RTP packet stream representing the voice via wireless interface 58. Similarly, upon receipt of an incoming RTP stream, the logic may cause processor to depacketize and decode the packet contents and to play out the underlying voice to a user.

b. Exemplary MSC

Figure 6:
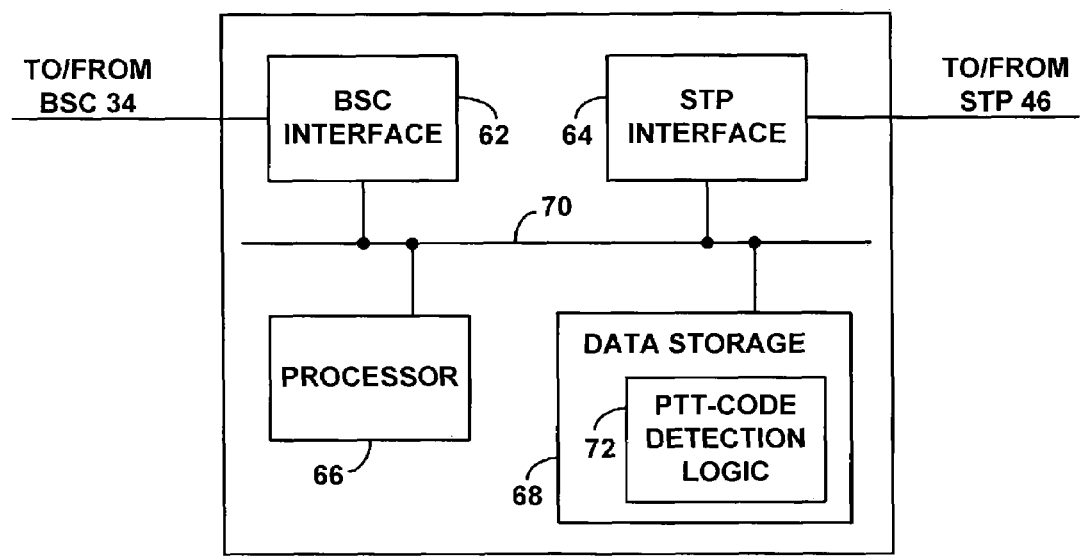
FIG. 6 is a block diagram depicting functional components of a mobile switching center operable in the exemplary embodiment.

The MSC 38 that serves originating mobile station 12 may also take various forms. By way of example, the MSC can be a Lucent 5ESS. More generally, FIG. 6 is a block diagram depicting some of the functional components of an exemplary MSC. As shown in FIG. 6, the MSC includes a BSC interface 62, an STP interface 64, a processor 66 and data storage 68, coupled together by a system bus, network or other mechanism 70.

Generally, the BSC interface 62 provides for connectivity with BSC 34, and the STP interface provided for connectivity with a signaling network comprising STP 46. Further, processor 66 may comprise one or more processors, and data storage 68 includes logic executable by processor 66 to carry out various function described herein.

For example, data storage 68 preferably includes intelligent-network logic 72 that causes processor 66 to detect when a PTT dial code is present in an origination message from a mobile station and to responsively send an ORREQ via STP interface 64 to SCF 48. As noted above, an exemplary ORREQ would carry the digits provided by the originating mobile station, including the PTT dial code and the target code. Further, the exemplary ORREQ would also provide an identification of the originating mobile station, such as a MIN for instance.

c. Exemplary SCF

Figure 7:
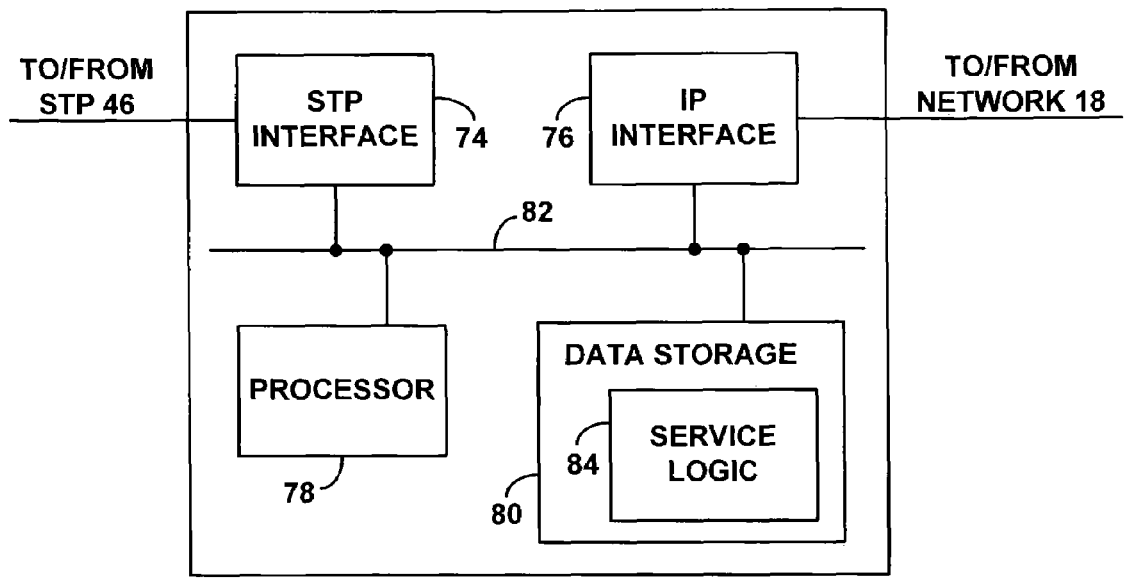
FIG. 7 is a block diagram depicting functional components of a service control function operable in the exemplary embodiment.

SCF 48, in turn, may also take various forms. By way of example, the SCF may take the form of an ISCP of the type manufactured by Telcordia Technologies. FIG. 7 is a block diagram generally depicting some of the functions that such an ISCP may contain, in order to carry out the exemplary embodiment. As shown in FIG. 7, the exemplary ISCP includes an STP interface 74, an IP interface 76, a processor 78 and data storage 80, coupled together by a system bus, network or other mechanism 82.

Generally, the STP interface 74 provides for connectivity with a signaling network comprising STP 46, and the IP interface 76 provides for connectivity with packet network 18. Further, processor 78 may comprise one or more processors, and data storage 80 includes logic executable by processor 78 to carry out various functions described herein.

For instance, data storage preferably includes service logic 84 that processor 78 executes in response to an ORREQ such as that described above from MSC 34. In particular, the logic may cause the processor 78 to read the dialed digits from the ORREQ, to detect the PTT dial code in the dialed digits, and to responsively forward to the PTT server, via IP interface 76 and network 18, (i) the target code and (ii) the originating mobile station's MIN (or suitable indications of these values).

d. Exemplary PTT Server

Figure 8:
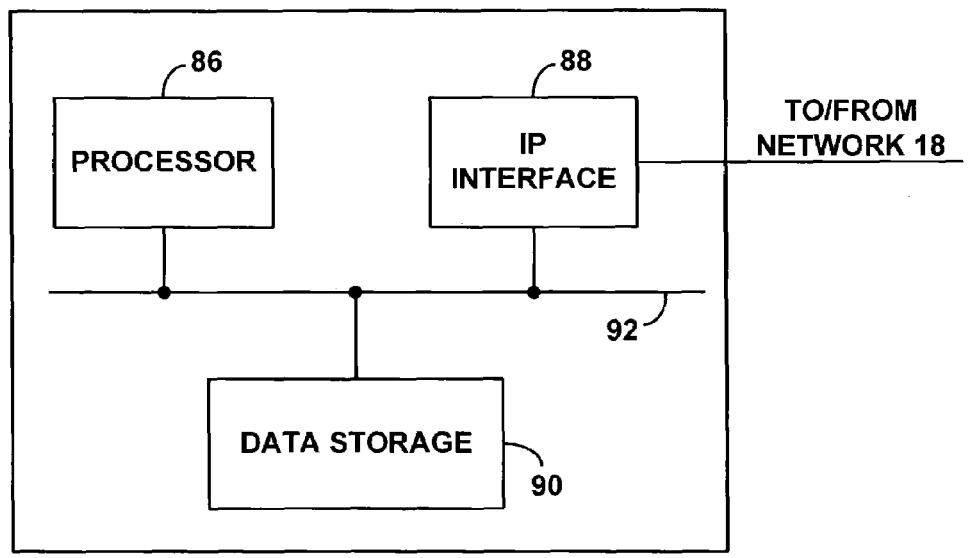
FIG. 8 is a block diagram depicting functional components of a PTT server operable in the exemplary embodiment.

PTT server 50 in FIG. 3 can also take various forms. For instance, the PTT server may be a programmed media server that sits at a defined address on packet network 16, or the PTT server may comprise multiple elements such as a third party call control server and a media server. FIG. 8 is a generalized block diagram of a representative PTT server 50, showing some of the functional components that it could contain. As illustrated, the PTT server 50 may include an IP interface 86, a processor 88 and data storage 90, tied together via a system bus, network or other mechanism 92.

IP interface 86 provides connectivity with packet network 18. Processor 88 may comprise one or more processors, and data storage 90 preferably includes logic executable by processor 88 to carry out various functions described herein.

For example, the logic may define a SIP UAC application, which enables the processor 88 to engage in SIP signaling, and an RTP application that enables the processor 88 to receive and send RTP streams. Further, the logic may include group data that translates between group IDs and member MINs.

Upon receipt from SCF 48 of a message that carries an originating mobile station ID and a target code, the logic may then cause processor 88 to set up an RTP leg with the originating mobile station and with each terminating station associated with the target code. As noted above, for instance, the logic may cause the processor 88 to send to each mobile station a SIP INVITE seeking to establish an RTP session with each station. In turn, the logic may then cause the processor to bridge those legs together to allow the parties to communicate with each other.

5. Conclusion

An exemplary embodiment has been described above. Those skilled in the art will understand, however, that changes and modifications may be made to this embodiment without departing from the true scope and spirit of the present invention, which is defined by the claims.

What is claimed is:

1. A method comprising:
   receiving at a switch, from an originating station, an origination message carrying dialed digits, the dialed digits including (i) a session-initiation feature code and (ii) a target code indicating at least one target with which to establish a real-time media session via a communication server;
   responsively signaling from the switch to a service controller, wherein responsively signaling from the switch to the service controller comprises (a) detecting the session-initiation feature code as an intelligent network trigger and (b) responsively sending a signaling message to the service controller, the signaling message carryying (i) the target code and (ii) an originating station identifier;
   signaling from the service controller to the communication server, pursuant to service logic at the service controller; and
   the communication server responsively inviting the originating station and the at least one target to participate in the real-time media session via the communication server.

2. The method of claim 1, wherein the originating station comprises a mobile station, and the switch comprises a mobile switching center, the method further comprising:
   receiving the origination message wirelessly at a base station and forwarding the origination message from the base station to the switch.

3. The method of claim 1, wherein the at least one target is a mobile station having a mobile identification number, and wherein the target code comprises the mobile identification number.

4. The method of claim 1, wherein the at least one target is a group, and wherein the target code comprises a group identifier.

5. The method of claim 1, wherein the originating station is a mobile station, and the originating station identifier is a mobile identification number.

6. The method of claim 1, wherein signaling from the service controller to the communications server comprises:
   sending a signaling message from the service controller to the communications server, the signaling message carrying (i) the target code and (ii) an originating station identifier.

7. The method of claim 1, wherein inviting the originating station and the at least one target to participate in the real-time media session via the communication server comprises:
   sending session invitation messages to the originating station and the at least one target.

8. The method of claim 7, wherein the session invitation messages comprise Session Initiation Protocol (SIP) INVITE messages.

9. The method of claim 8, wherein sending the session invitation messages comprise sending the session invitation messages to a proxy server for transmission to the originating station and the at least one target.

10. A system comprising:
    a wireless communication device;
    a switch;
    a service control function; and
    a communication server,
    wherein the wireless communication device is arranged (i) to receive a user request to initiate a packet-based real-time media session with at least one target party and (ii) to responsively send to the switch via an air interface access channel a call origination message that carries a session-initiation feature code and a target code indicative of the at least one target party,
    wherein, upon receipt of the call origination message, the switch is arranged to detect the session-initiation feature code as an intelligent-network trigger and to responsively send a first message to the service control function, providing the service control function with at least the target code and an identification of the wireless communication device,
    wherein the service control function is arranged to receive the first message, pursuant to service logic, to send a second message to the communication server, providing the communication server with at least the target code and an identification of the wireless communication device, and
    the communication server is arranged to receive the second message and to responsively invite the wireless communication device and the at least one target party to participate in the packet-based real-time media session via the communication server.

11. The system of claim 10, wherein the packet-based real-time media session is a voice-over-packet session, and wherein the wireless communication device comprises a session-initiation button that a use can engage to provide the wireless communication device with the user request.

12. The system of claim 10, wherein the communication server is arranged to invite the wireless communication device and the at least one target party to participate in the packet-based real-time media session by sending to each of the wireless communication device and the at least one target party a Session Initiation Protocol (SIP) INVITE message.

13. The system of claim 10, wherein the communication server is further arranged to receive an incoming voice-over-packet stream from the wireless communication device and to send an outgoing voice-over-packet stream to each of the at least one target party.

14. The system of claim 10, wherein each of the at least one target party is also a wireless communication device.

* * * * *